United States Patent Office 3,534,069
Patented Oct. 13, 1970

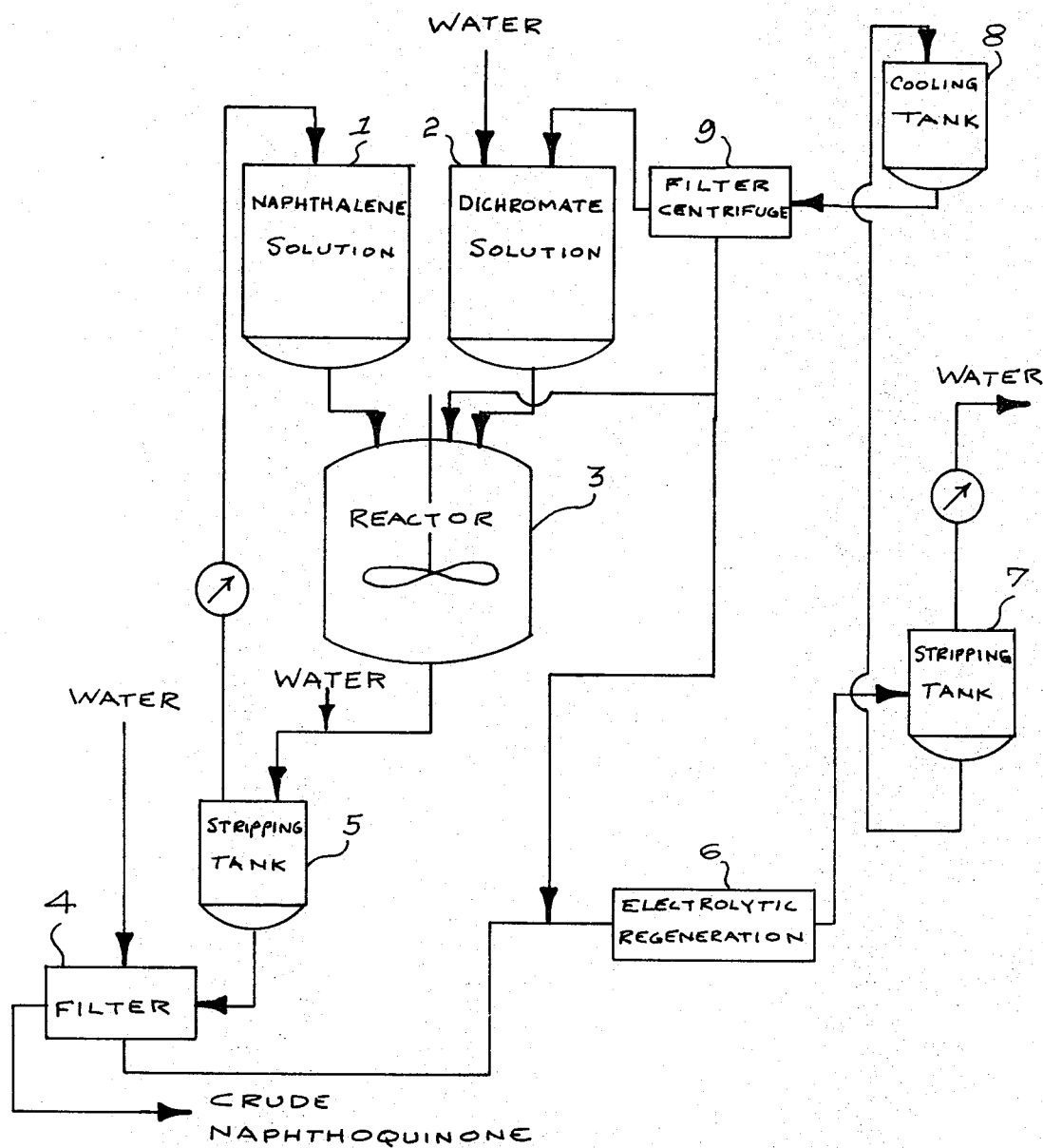

3,534,069
PRODUCTION OF ALPHA-NAPHTHOQUINONES
Louis A. Joo, Johnson City, and Loren A. Bryan, Elizabethton, Tenn., assignors to Great Lakes Carbon Corporation, New York, N.Y., a corporation of Delaware
Filed Mar. 20, 1967, Ser. No. 624,450
Int. Cl. C07c 49/60
U.S. Cl. 260—396
4 Claims

ABSTRACT OF THE DISCLOSURE

Naphthalene or a β-substituted naphthalene, fully or partially dissolved in an inert water-immiscible organic liquid, is oxidized by an aqueous sulfuric acid solution of fractionally crystallized electrolytically regenerated hexavalent chromium compounds to yield up to about 55% α-naphthoquinone or a higher proportion of β-substituted naphthoquinone. The reaction preferably takes place at 0 to 60° C. for 2 hours to 8 hours. Reagents and solvents are recovered and recycled.

---

In a co-pending application, S.N. 610,276, filed on Jan. 19, 1967, there is described a new process for oxidizing naphthalene and β-substituted naphthalenes to the corresponding quinones by means of an aqueous sulfuric acid solution of partly regenerated hexavalent chromium compounds. With unsubstituted naphthalene as the starting material, the process permits yields of naphthoquinone equal to the best that the art can provide, i.e. up to 40%, and this in spite of the operational and concentration difficulties associated with the requirement of electrolytic regeneration of the spent chromium compounds. It has now been discovered that the regenerated chromium compound can be fractionally crystallized to a 95+% $Cr^{+6}$ content in one operation to provide an oxidant solution so advantageously purified that yields of naphthoquinone approaching 60% become possible even with cheap, partly regenerated chromium compounds. This new process shall be described fully after a review of the prior art.

THE PRIOR ART

The production of α-naphthoquinone has so far proved relatively complicated and expensive, no matter which method is selected from those outstanding in the art. In one process, for instance, naphthoquinone is obtained by the condensation of benzoquinone with butadiene and subsequent dehydrogenation. While this process is still in current use, its inconvenience in multiplicity of steps, amount of equipment and time required can be easily imagined when it is considered that the synthesis of benzoquinone must first be carried out before the synthesis of naphthoquinone is attempted. Several simpler processes have been devised to avoid the undesirable aspects of the condensation method. These generally involve direct oxidation of naphthalene in vapor or liquid phase. However, vapor phase oxidation over a stabilized vanadium oxide catalyst is attended by severe difficulties in obtaining good quinone from the oxidate mixtures, contaminated as they are with, among other things, 10% to 40% unconverted naphthalene as well as with phthalic acid. For this reason, liquid phase oxidation of naphthalene by hexavalent chromium compounds has been generally favored even if it tends to yield predominant proportions of phthalic acid, a more highly oxidized product of naphthalene. Thus, by adding an acetic acid solution of naphthalene to an aqueous acetic acid solution of chromium trioxide, there has been obtained yields of naphthoquinone varying from 20% to 33%, based on starting naphthalene. A more interesting approach which improves upon earlier chromic acid oxidations is described by Hyman and Peters in U.S. Pat. No. 2,402,226. It consists essentially in carrying out the oxidation of naphthalenes by chromic acid in the presence of a diluent such as benzene or carbon tetrachloride. This and further refinement, such as forming the chromic acid in situ as needed, by the gradual addition of sulfuric acid during the course of the reaction, permits the obtention of a range of naphthoquinone yields from about 40% in the case of naphthalene to almost 100% with certain β-substituted naphthalenes.

Although the oxidation of naphthalene with hexavalent chromium ion to naphthoquinone, phthalic acid and carbon dioxide consumes large quantities of oxygen as demonstrated by the following equations:

(I)  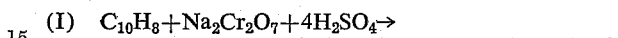

(II) 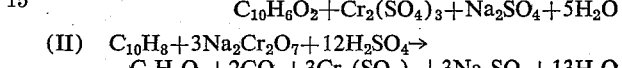

the high solubility in aqueous medium of both sodium dichromate and the chromic acid that it forms in the presence of sulfuric acid, makes it possible to obtain concentrated, strongly oxidizing solutions. The problem faced by the art here has been to maintain, in the presence of such a strong oxidant, conditions which favor the partial oxidation of naphthalene to naphthoquinone, according to Equation I, and which repress the formation of phthalic acid illustrated by Equation II. As just noted, the process disclosed in U.S. 2,402,226 has been so far the most successful of the published methods in accomplishing this delicate control of the reaction. That process however is limited to the use of fresh sodium dichromate. It would certainly be desirable to use for the oxidation hexavalent chromium salts that have been partly regenerated by the electrolytic process described in co-pending application Ser. No. 493,995, filed on Oct. 8, 1965, now U.S. Pat No. 3,450,623, issued June 17, 1969.

One of the difficulties envisaged in an attempt to devise an overall cyclic process in which the chromium salt oxidant is alternately reduced during oxidation of a naphthalene and regenerated electrolytically, resides in that if stoichiometric amounts of $Cr^{+6}$ ions and sulfuric acid are used as taught by Hyman and Peters, the conductivity of the spent chromium salt solution does not permit electrolytic regeneration. The cycle cannot be completed. Addition of sulfuric acid and water to permit regeneration, if carried out before the oxidation, interferes with the removal of the organic solvent and, more seriously, tends to produce lower yields of the naphthoquinone through facilitation of polymerization of this compound. On the other hand, to add the sulfuric acid after removal of the naphthoquinone and before the regeneration obviates any gain made elsewhere in the process since sulfuric acid cannot be removed easily after it has served its purpose. Another complication tending to lower the yield of a liquid phase naphthalene oxidation by regenerated chromium compounds is that the impossibility of adding the sulfuric acid gradually, due to the fact that it must be already present in the regeneration step, withdraws from any cyclic process the gains that Hyman and Peters have claimed for the in situ generation of chromic acid. These then are some of the problems faced in this endeavor.

These and other difficulties have been partly overcome as noted earlier by the process described in S.N. 610,276.

SUMMARY OF THE INVENTION

It has now been discovered that the problems associated with the use of electrolytically regenerated chromium compounds for the oxidation of naphthalenes to α-naphthoquinones can be substantially by-passed by isolating the hexavalent chromium from the regeneration solution. Such as operation would be of no value were it not for the interesting discovery that 95+% of the hexavalent chromium can be crystallized out of the regeneration solution by one concentration and filtration operation. By this technique, there is obtained out of the low cost part regeneration of Cr+3 compounds, a highly concentrated Cr+6 product which can be formulated more precisely with regenerated material than formerly possible and which renders the oxidation reaction more controllable through such effects as lower viscosity, smaller volume and consequently improved mixing. The lower criticality of the mixing, the gradual addition of the chromic acid oxidant to the naphthalene substrate, the lower reaction temperatures, and the diminished concentration of sulfuric acid which thus become possible all contribute to an increase in the yield of α-naphthoquinone of up to 50%, a rather striking improvement in the light of prior art performance.

DESCRIPTION OF THE DRAWING

The overall cyclic process of naphthalene oxidation, hexavalent chromium compound regeneration and isolation can be readily visualized by reference to the flow-sheet diagram accompanying the specification, said flowsheet representing one embodiment of the invention. It should be noted at this point that only such equipment as is necessary for easy visualization of the process has been included in the diagram.

Referring to the diagram, it is seen that a mixture of the naphthalene with a solvent such as carbon tetrachloride is first prepared and stored in make-up tank 1. Tank 2 contains a reconstituted aqueous sulfuric acid solution of the fractionally crystallized Cr+6 compound obtained by electrolytic partial regeneration of Cr+3 in the spent liquors from a previous oxidation performed with either fresh sodium dichromate, sulfuric acid and water or with an already regenerated hexavalent chromium compound solution.

The naphthalene suspension is introduced into reactor 3, a vessel equipped with a high-speed stirrer, heating and cooling facilities and a condenser. While vigorously stirring and maintaining the temperature of the reactor contents at 0 to 60° C. by heating and cooling, as necessary, a calculated quantity of reconstituted dichromate oxidant solution from tank 2 is gradually added to the reaction mixture in reactor 3. The reaction takes place during a period of 2 to 8 hours, including the addition time. The reaction mixture is then diluted with some water and pumped into stripping tank 5 where it is heated under reduced pressure with continuous stirring to remove the naphthalene solvent. The solvent is returned to tank 1. The pot residue is then passed through filter 4 where the crude naphthoquinone is removed from the process after having been washed free of chromium salts with a quantity of water that is subsequently combined to the filtrate. The naphthoquinone is purified according to known methods or modifications thereof.

The filtered spent oxidant liquor, combined with the trivalent chromium compound containing filtrate remaining from the fractional crystallization of the hexavalent chromium compound used in the naphthalene oxidation that produced said spent liquor, is pumped to cell 6 for electrolytic regeneration. The regenerated solution is stripped of most of its water in tank 7, cooled in tank 8 and passed through filter 9. The trivalent chromium sulfate filtrate containing part of the sulfuric acid is then recycled to the regeneration cell 6, as just noted, while the hexavalent compounds mixed with some sulfuric acid and some chromium sulfate are routed to tank 2 for dilution, storage and reuse. This completes the cycle.

DETAILED DESCRIPTION

Examples will now be provided to describe the invention in greater operational detail. It must be kept in mind however that these embodiments are not to be construed as limits of the invention beyond those set by the appended claims.

EXAMPLE 1

A naphthalene oxidant solution was prepared by stripping 1600 parts of water, or 72.5%, from a 3400 parts solution containing water, sulfuric acid, sodium ions and chromium ions. The oxidant solution had contained, before stripping, the following ingredients:

|  | Parts by weight |
|---|---|
| Cr+6, calculated as $Na_2Cr_2O_7$ | [1] 229.5 |
| $H_2SO_4$ | 480.6 |
| $Na_2SO_4$ | 128.5 |
| $Cr_2(SO_4)_3$ | [2] 355.6 |
| $H_2O$ | 2206.8 |
|  | 3401.0 |

[1] Equal to 94.6 Cr+6.
[2] Equal to 94.6 Cr+3.

This solution had been obtained by electrolytic treatment of a spent oxidant in which all of the chromium was in a reduced state (valence +3) to one in which substantially half of the chromium is in the oxidized state (valence +6). After completion of the stripping, the residue (1800 parts) was filtered to yield 785 parts of mushy solid oxidant which contained 97% of the oxidized chromium and 31% of the reduced chromium, together with sorbed sulfuric acid and water. Although there is generally sufficient sulfuric acid remaining in this oxidant to satisfy the requirements of Equation I, it may be necessary at times to make up the sulfuric acid concentration to that required level.

A slurry of 45 parts 98.5% pure naphthalene in 63 parts carbon tetrachloride was charged into the reactor. A mixture of oxidant such as just described, 766 parts (217 parts $Na_2Cr_2O_7$=89.6 parts Cr+6 net), and water, 214 parts, was prepared in the dichromate tank and added gradually to the constantly stirred naphthalene slurry. The addition lasted 2 hours with the temperature being maintained at approximately 25±5° C. by cooling. After completion of the addition, stirring was continued for 0.5 hour at about 15° C. and then for one more hour at 40° C. The reaction mixture was transferred to the solvent stripping tank where the carbon tetrachloride was removed by distillation under reduced pressure. The residual aqueous acid slurry was cooled to a temperature within the range of 30 to 40° C. and filtered. The cake was washed several times with cold water until free of chromium salts. All the filtrates and washings obtained during this run, starting with the post-water-stripping filtration residue from the regenerated oxidant solution, were combined and regenerated after adjustment of the water content to the level required for the electrolytic process.

Analysis of the product obtained by this procedure indicated that 82% of the naphthalene had been oxidized. The yield of naphthoquinone was 41%, based on the naphthalene charged, and 50% based on the naphthalene converted. The sodium dichromate ($Na_2Cr_2O_7 \cdot 2H_2O$) requirement for the run was 8.4 parts per part of naphthoquinone produced.

EXAMPLE 2

A naphthalene oxidant was prepared by stripping approximately 75% of the water from a regenerated solution of chromium ion, sodium ion, sulfuric acid and water, in which 70% of the chromium was in the hexavalent state. This was filtered to yield 700 parts of mushy solids containing substantially 99% of the oxidized chromium ions, 37% of the reduced chromium ions, 52% of the sulfuric acid and about 23% of the water. The filtrate containing the rest of the components, 555 parts, was kept for regeneration.

The mushy solids, 566 parts (167 parts $Na_2Cr_2O_7$), was mixed with water, 173 parts, and used for oxidizing naphthalene, 45 parts, in the manner of Example 1, the only changes being the use of slightly higher temperatures. The addition of oxidant was carried during a period of 2 hours at temperatures within the range of 20 to 35° C. while stirring was continued, after its completion, for 1.5 hours at 30 to 45° C. The remaining process was identical to that of Example 1.

Analysis showed that 68% of the naphthalene had been oxidized to yield 38% naphthoquinone, based on the naphthalene charge, or 56% based on the converted naphthalene fraction. The sodium dichromate $$(Na_2Cr_2O_7 \cdot 2H_2O)$$

for the run was 8.7 parts per part of naphthoquinone produced.

EXAMPLE 3

The operations of Example 1 were repeated using the same proportions and ingredients except that the oxidation reaction temperature was lowered to approximately 10±2° C.

Under these optimum conditions of temperature, concentrations and handling, there was obtained 362 parts of α-naphthoquinone, 41 parts of phthalic acid and 149 parts of unconverted naphthalene. The yield of the desired product was thus 48.9%, based on the charge of naphthalene, or 55.7%, based on the naphthalene converted.

The concentrations and proportions of each component of the reaction mixture may be varied to the same extent taught in S.N. 610,276, except of course for the $Cr^{+3}$ and sulfuric acid content and the $Cr^{+6}$ to $Cr^{+3}$ ratio of the oxidant and the lower concentration and quantity of $Cr_2(SO_4)_3$ permits.

Thus, it has been found that the acid phase of the oxidation reaction mixture can consist of from 25% to 75% water although a 30 to 50% range is preferred.

The concentration of trivalent chromium is naturally irrelevant within the limits imposed by the hexavalent chromium concentration operation which is a characteristic of the present invention. As to the concentration of the hexavalent ion, however, it has been established that an excess of about 50 to 160% over the stoichiometric proportions called for by Equation I should preferably be used. Such an excess, under the other conditions set forth within this specification, produces fairly constant yields of naphthoquinone while allowing for what is lost in the production of phthalic acid and elsewhere. Greater or lesser concentrations are not ruled out however if proper mixing is provided or if difficulties in recovery are ignored. These are matters of cost and convenience.

As to the sulfuric acid concentration, an excess of up to 300%, based on the naphthalene charge is permissible. It should be recalled in this respect that too much sulfuric acid complicates processing by increasing viscosity and by causing polymerization of the naphthoquinone. Preferred concentrations therefore range from about 50 to about 200% more than stoichiometric requirements.

The choice of organic liquid in which to fully or partially dissolve the naphthalene charge is seriously restricted by the severe requirements of the reaction. Such liquid that is selected must first be a solvent for naphthalene and, to some extent, for naphthoquinone. It must be immiscible with the aqueous phase of the reaction. It must be fairly resistant to oxidation by chromic acid. And finally, it should have a boiling point that is preferably not higher than about 100° C. for ease of processing and recovery. Among the few organic liquids that meet most of these stringent requirements are the lower boiling chlorinated hydrocarbons and benzene. Carbon tetrachloride is preferred.

The oxidation temperature must be kept between 0 and 60° C. for satisfactory yields of naphthoquinone. Below 0° C., there arises solubility and viscosity problems to an extent such that improved stirring will be of no avail. Over-oxidation takes place due to too high localized $CrO_3$ concentrations. Above 60° C., consistently low yields of naphthoquinone have been obtained by oxidation with regenerated chromium compound solution. Naphthoquinone yields are maximized at temperatures within the range of 5 to 30° C.

The last factor of importance on converting naphthalene to α-naphthoquinone by means of regenerated chromium salts is the oxidation time. This depends to some extent on equipment design inasmuch as temperature control facilities are involved. In the present instance, guidelines have been established from empirical data at about 2 to 8 hours.

As demonstrated by the prior art as well as supported by theoretical consideration, the utility of this process extends to the oxidation of β-substituted naphthalenes such as, for example, the 2-methyl and the 2,3-, 2,6-, 2,7-, and 2,8-dimethylnaphthalenes. It is known to the art that oxidation by chromic acid is less likely to proceed beyond the 1,4-positions to cause ring opening when the β- or 2-position is substituted. Also, still less over-oxidation beyond the naphthoquinone has been noted when another position is substituted in addition to the 2-position.

What is claimed is:

1. A process for converting a naphthalene compound selected from the class consisting of naphthalene and lower alkyl beta-substituted naphthalenes to the corresponding alpha-naphthoquinone, which consists in subjecting the naphthalene in an inert, water-immiscible solvent carrier to the oxidizing action of an aqueous sulfuric acid solution of a chromium compound that has been electrolytically regenerated to a hexavalent chromium content of 30 to 70% and subsequently fractionally crystallized by concentration and cooling to remove more than 50% of the unregenerated trivalent chromium and recovering an oxidant containing more than 90% of hexavalent chromium ions, said sulfuric acid solution containing from 25 to 75% water, from 50 to 160% excess of hexavalent chromium and from 50 to 200% sulfuric acid in excess of the stoichiometric amount required, based on the naphthalene compound.

2. The process of claim 1 wherein the oxidation is carried out at 0 to 60° C. for a period of 2 to 8 hours.

3. The process of claim 1 wherein unsubstituted naphthalene is oxidized at a temperature within the range of 5 to 30° C. for a period of 3 to 5 hours.

4. The process of claim 1 wherein the hydrocarbon to be oxidized is a 2-methylnaphthalene.

References Cited

UNITED STATES PATENTS 2,402,226  6/1946  Hyman et al. _____ 260—396

LORRAINE A. WEINBERGER, Primary Examiner

L. A. THAXTON, Assistant Examiner

U.S. Cl. X.R.

204—129